Dec. 12, 1967   D. F. GOURLAY ET AL   3,357,179
ACTUATION SYSTEM

Filed Jan. 14, 1966   7 Sheets-Sheet 1

INVENTORS
DOUGLAS F. GOURLAY
HAROLD J. STRAUT
BY
Thomas W. Kennedy
ATTORNEY

DOUGLAS F. GOURLAY
HAROLD J. STRAUT
INVENTORS

BY
Thomas W. Kennedy
ATTORNEY

Dec. 12, 1967

D. F. GOURLAY ET AL 3,357,179

ACTUATION SYSTEM

Filed Jan. 14, 1966

DOUGLAS F. GOURLAY
HAROLD J. STRAUT
INVENTORS

BY Thomas W. Kennedy
ATTORNEY

DOUGLAS F. GOURLAY
HAROLD J. STRAUT
INVENTORS

BY Thomas W. Kennedy
ATTORNEY

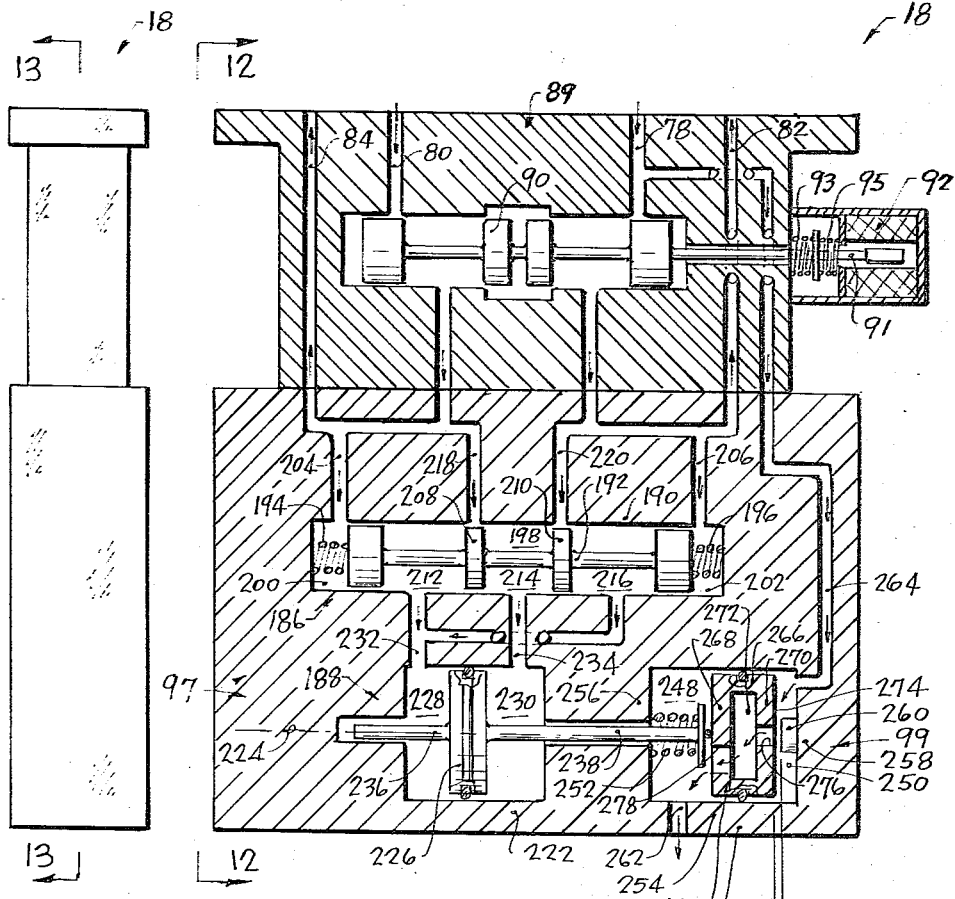

United States Patent Office 3,357,179
Patented Dec. 12, 1967

3,357,179
ACTUATION SYSTEM
Douglas F. Gourlay, Closter, and Harold J. Straut, Wayne,
N.J., assignors to General Precision Inc., Little Falls,
N.J., a corporation of Delaware
Filed Jan. 14, 1966, Ser. No. 520,560
5 Claims. (Cl. 60—52)

ABSTRACT OF THE DISCLOSURE

A hydraulic actuation system wherein wastage of power is substantially minimized by using a linear-type, load-sensing, pressure-relief valve which varies the system pressure level and the input power is directly proportional to the varying actuation load and the required output power.

Figure 2:
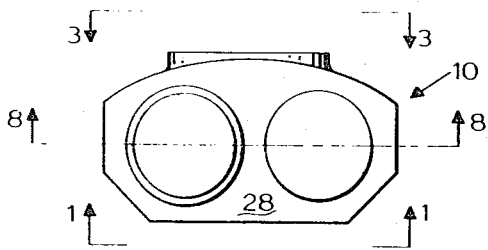

The present invention relates to hydraulic actuation systems, and particularly to a closed-loop, constant-flow, variable-pressure, hydraulic-actuation system.

A prior-art hydraulic-actuation system, which is a closed-loop, constant-flow, constant-pressure type of system is described in U.S. Patent No. 3,201,939, which is assigned to the same assignee as in this invention. An improved version of said prior-art hydraulic actuation system, which is a closed-loop, constant-flow, two-pressure-level type of system, is described in the publication by W. Seamone, APL Technical Digest, November-December, 1964, pages 12–16, inclusive.

Said prior-art hydraulic actuation system includes a reservoir, a pump, a valve and a dual-chamber actuator. Said system also has high-pressure passages, which connect the pump to the valve and which connect the valve to the high-pressure actuator chamber. Said system also has low-pressure passages, which connect the low-pressure actuator chamber to the valve and which connect the valve to the reservoir. Said high-pressure passage, which connects the pump to the valve, also has a two-position, load-sensing, pressure-relief valve with a return passage connecting to the reservoir. With such construction, there is provided a two-level, high-pressure passage.

One problem with such a prior-art hydraulic actuation system is that there is a substantial wastage of power since its input power remains substantially constant while its output power varies substantially within each power level.

In accordance with one embodiment of the present invention, wastage of power is substantially minimized by using a linear-type, load-sensing, pressure-relief valve, which varies the system pressure level and the input power in direct proportion to the varying actuator load and required output power.

Accordingly, it is one object of the invention to provide a closed-loop, constant-flow, variable-pressure type of hydraulic actuation system for driving a variable load.

It is another object of the invention to provide a hydraulic actuation system according to the aforementioned object, in which the variation in the ratio of power input to power output is substantially minimized.

It is a further object of the invention to provide a hydraulic actuation system according to the aforementioned objects, which has a reciprocating actuator with a piston that operates with a substantially-constant velocity.

It is a still further object of the invention to provide a sealed and submerged hydraulic actuation and torquing system according to the aforementioned objects, which has a constant-pressure, low-pressure portion, which has a variable-pressure, high-pressure portion, and which has an integral torquing shaft extending therefrom.

To the fulfillment of these and other objects, the invention provides a load-sensing valve comprising:

A housing with a feed passage for inflow and a supply passage for outflow and a bypass passage for return flow;

A regulator means interconnecting said feed passage to said bypass passage for regulating flow therethrough; and A sensor means connecting to said supply passage for sensing pressure therein and engaging said regulator means for regulating flow to said return passage according to said supply pressure.

Figure 6:
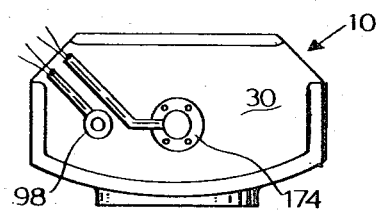
Figure 1:
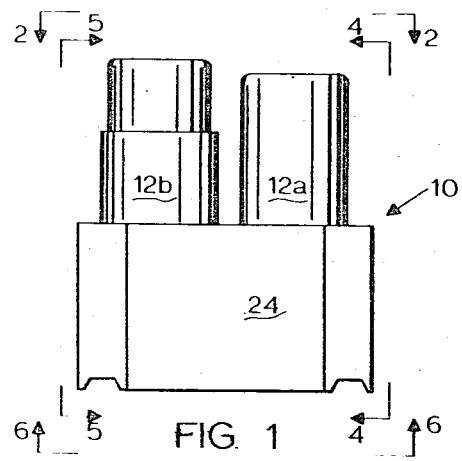
Figure 4:
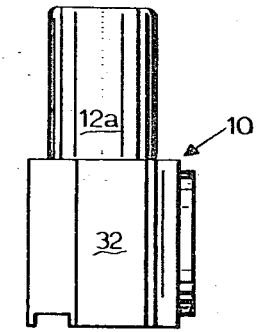
Figure 3:
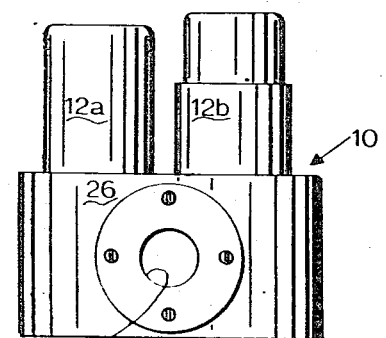
Figure 5:
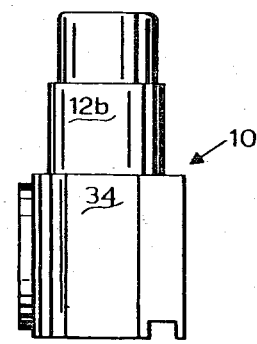
Figure 7:
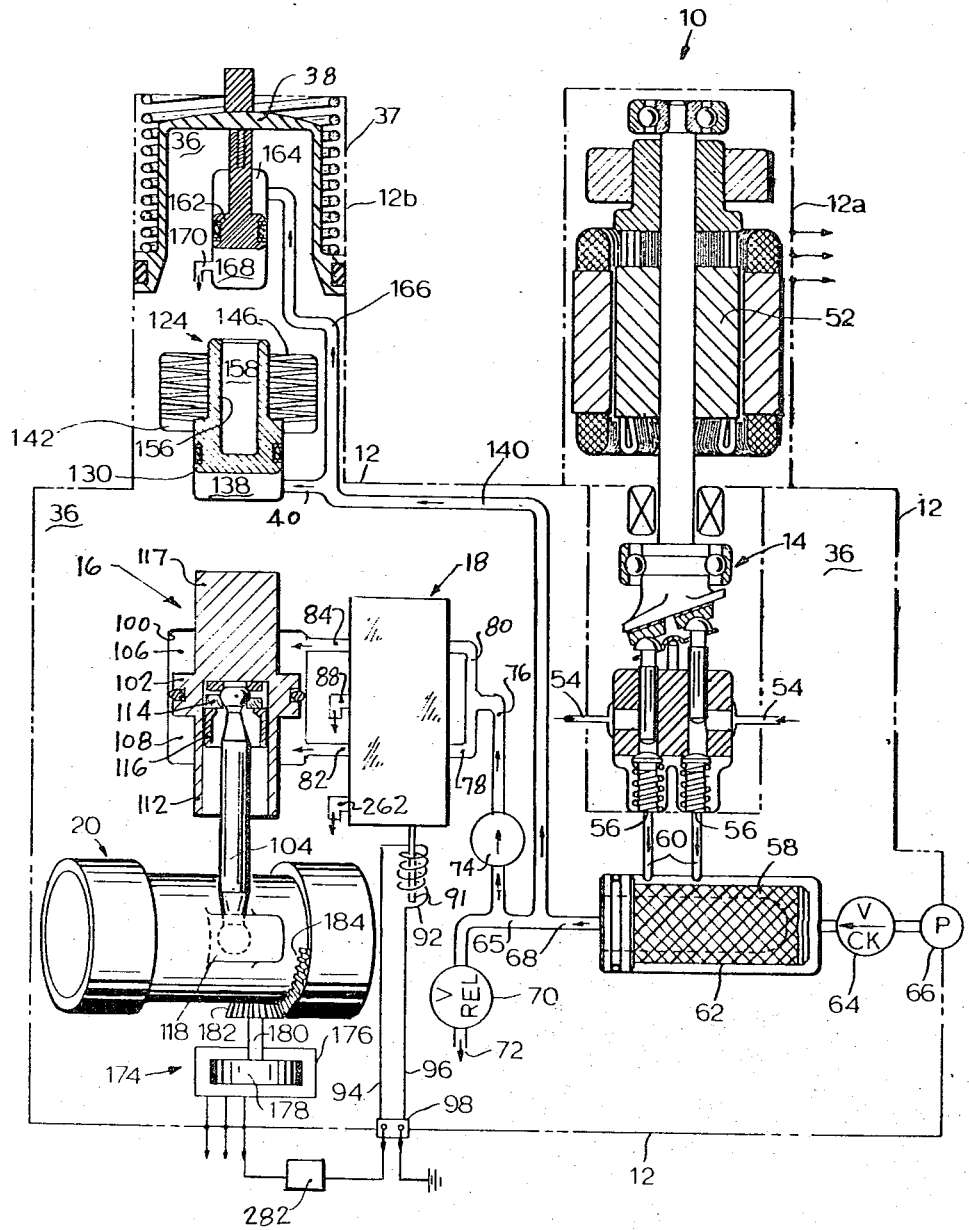
Figure 8:
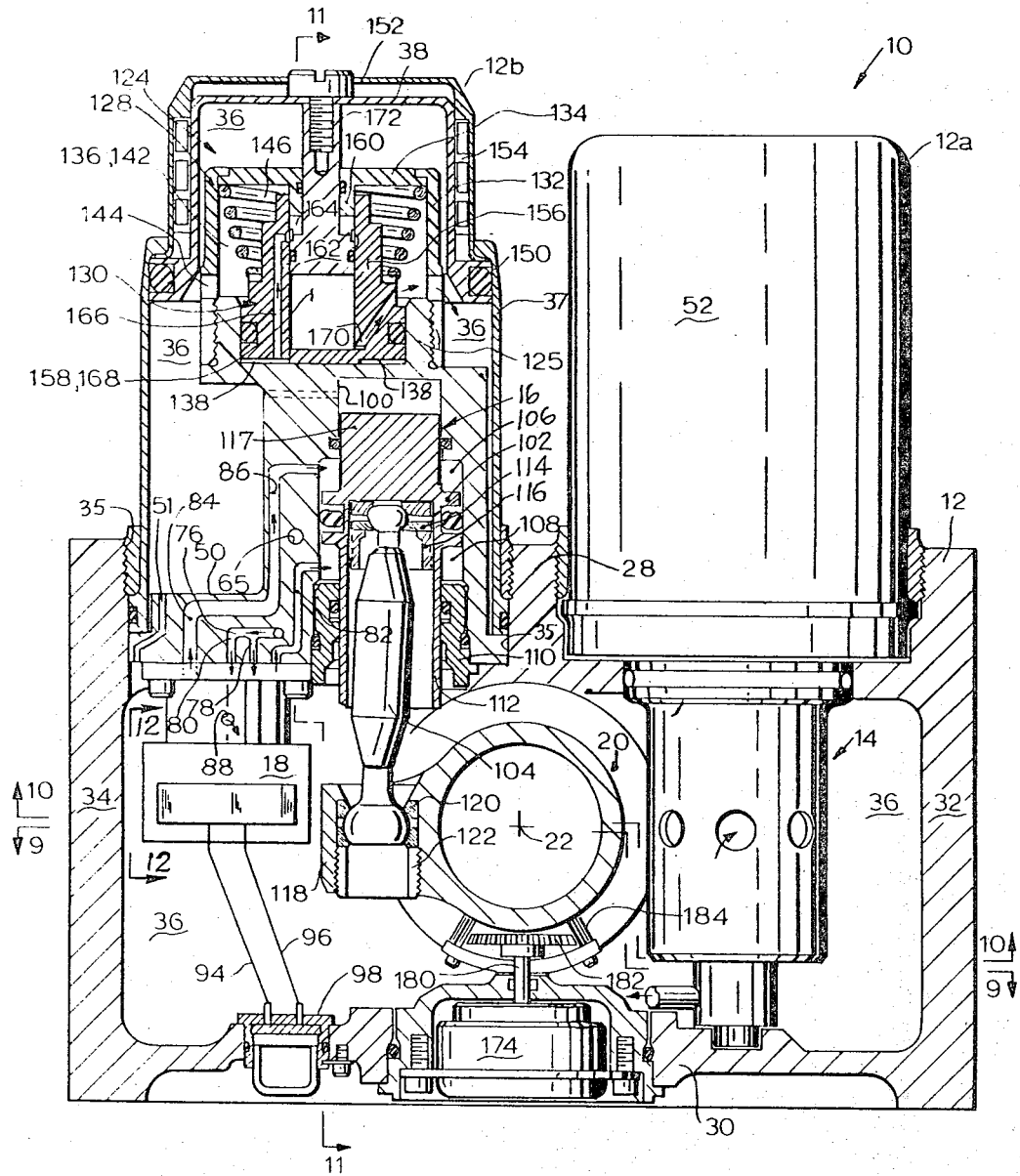
Figure 9:
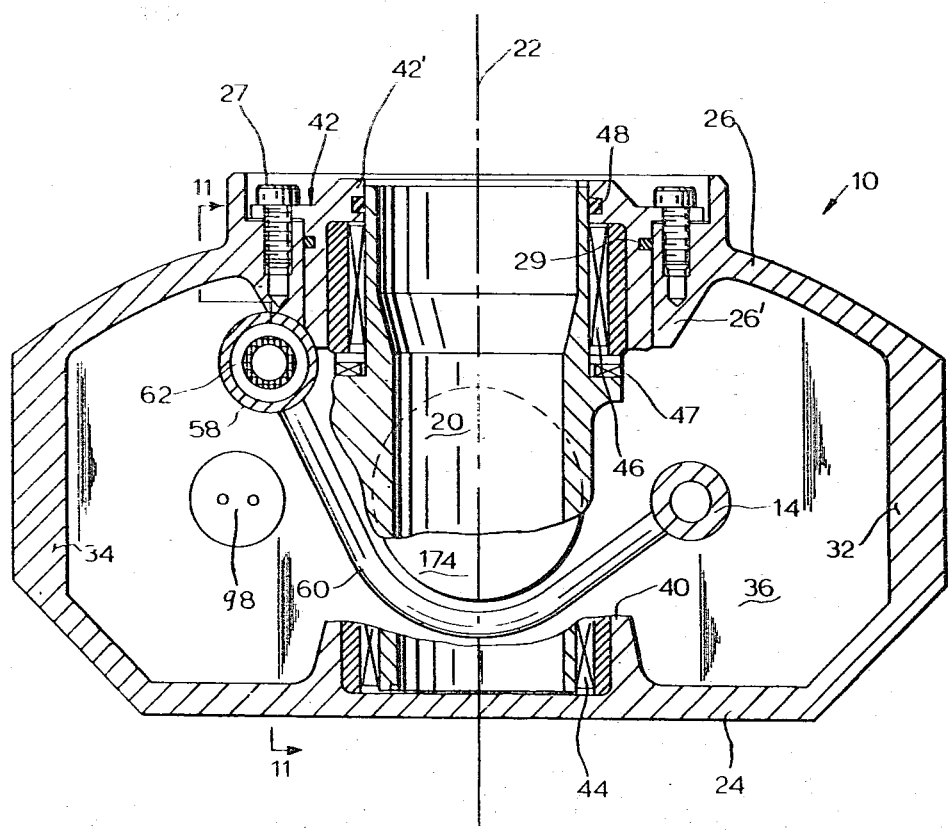
Figure 10:
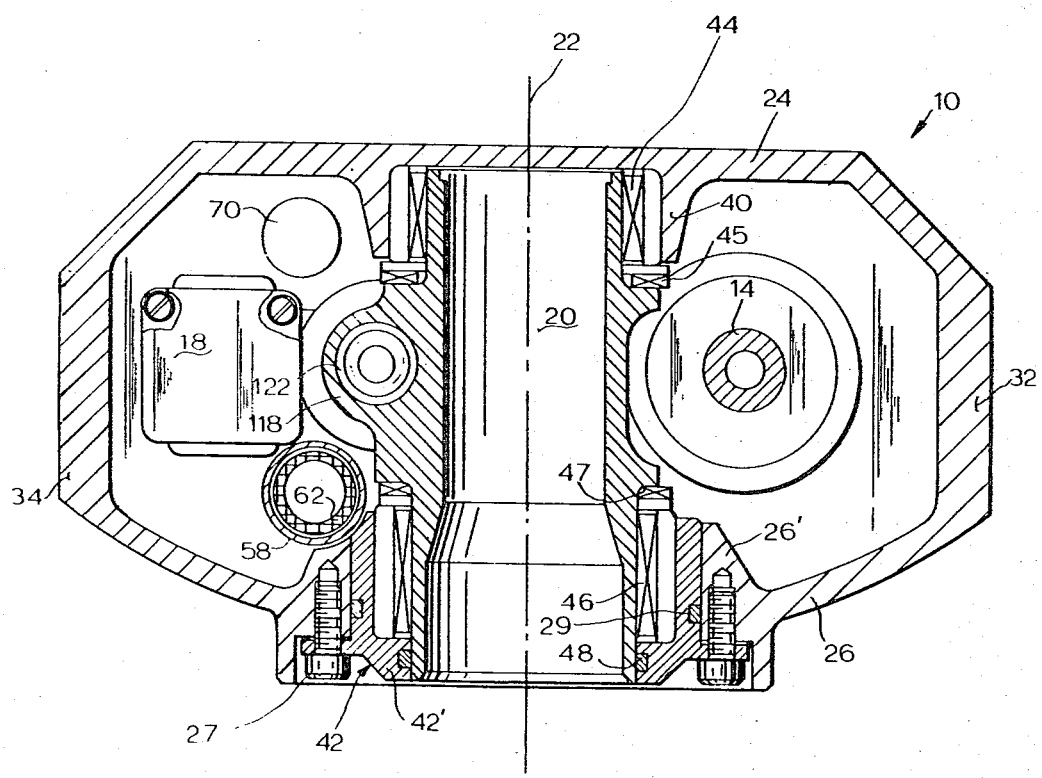
Figure 11:
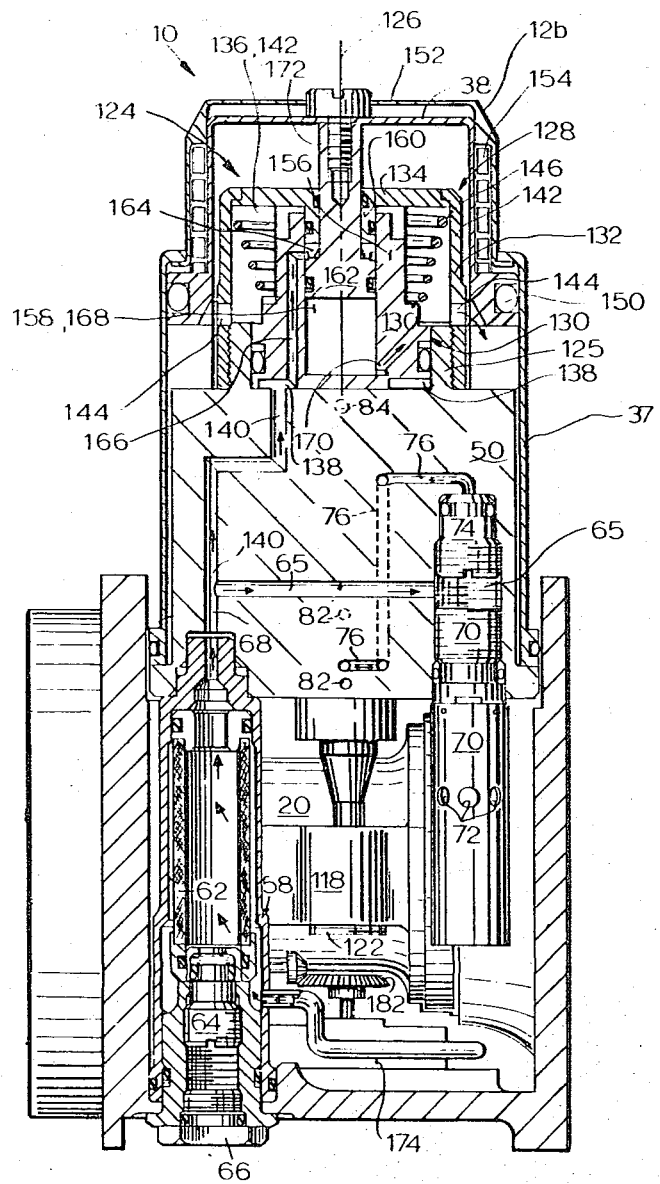

Other objects of the invention will become apparent upon reading the annexed detail description in connection with the drawings wherein like parts are designated by like numerals throughout the several views and wherein:

FIG. 1 is a view of the exterior of a hydraulic actuating unit embodying features of the present invention;
FIG. 2 is a view taken on line 2—2 of FIG. 1;
FIG. 3 is a view taken on line 3—3 of FIG. 2;
FIG. 4 is a view taken on line 4—4 of FIG. 1;
FIG. 5 is a view taken on line 5—5 of FIG. 1;
FIG. 6 is a view taken on line 6—6 of FIG. 1;
FIG. 7 is a schematic diagram of one form of hydraulic actuating system, such as contained in the unit shown in FIGS. 1–6, embodying the present invention;
FIG. 8 is a sectional view as taken on line 8—8 of FIG. 2;
FIG. 9 is a sectional view as taken on line 9—9 of FIG. 8;
FIG. 10 is a sectional view as taken on line 10—10 of FIG. 8;
FIG. 11 is a sectional view as taken on line 11—11 of FIG. 9;
FIG. 12 is a sectional view as taken on line 12—12 of FIG. 8; and
FIG. 13 is a sectional view as taken on line 13—13 of FIG. 12.

Referring to FIGS. 1 through 6 of the drawings, one embodiment of the present invention comprises a self-contained hydraulic actuating or torquing unit 10 enclosed within a housing 12 which contains working fluid. Housing 12 includes a first protruding housing section 12a which contains part of a submerged pump (hereinafter described and designated by reference numeral 14) for pressurizing one fluid, and a second protruding housing section 12b, which contains part of a submerged actuator (also described hereinbelow and designated by reference numeral 16) that is driven by the pressurized fluid. The system is schematically shown in FIG. 7.

As shown in FIG. 8, unit 10 also has a flow-control servo valve means 18 which controls fluid leaving pump 14 and entering actuator 16. Unit 10 also contains an internal shaft 20 with an axis 22 accessible through aperture 23 in casing 12. Actuator 16 imparts reversible rotary movement of shaft 20 about axis 22 relative to casing 12. A work load (not shown) is preferably connected to shaft 20 coaxially therewith along axis 22.

As best appears in FIGS. 1–6, casing or main support 12 has front and back walls 24, 26 top and bottom walls 28, 30 and end walls 32, 34 which form a sealed reservoir cavity 36 (FIG. 7) therebetween. In housing section 12b, top wall 28 has an opening 35, which is covered over by a closed-ended, projecting reservoir cylinder 37, that encloses and receives a case-pressurizing piston 38, which moves relative to cylinder 37 to maintain fluid pressure in cavity 36.

As shown in FIGS. 9 and 10, front wall 24 of the casing is provided with an internal annular boss 40 holding an anti-friction bearing 44 journaling one end of shaft 20. The other end of shaft 20 is journaled in an anti-friction bearing 46 mounted in a bearing retainer 42 coaxially received in an internal boss 26' on back wall 26 of the casing. Bearing retainer 42 is secured in position by suitable means such as threaded fasteners 27, and is sealed to boss 26' by means of an O-ring 29 or the like. An inwardly-extending flange 42' on bearing retainer 42 limits axial displacement of bearing 46 and, on its inner circumferential face, carries an O-ring 48 or similar packing which engages the outer surface of shaft 20, thus precluding leakage of hydraulic fluid through bearing 46. Shaft 20 also carries thrust-type bearings 45, 47 adjacent bearings 44, 46 respectively.

Top wall 28 (FIG. 8) has a removable wall portion or a hydraulic manifold portion 50, which forms the support for actuator 16 and valve 18. Manifold 50 divides reservoir cavity 36 into an upper and lower portion and has a passage 51 therethrough connecting the separate portions of reservoir cavity 36.

Pump 14 (FIGS. 7 and 8), which is preferably a wobble-plate type of pump, has a drive means 52, which is preferably an electric motor. Motor 52 is mounted on and forms a removable portion of top wall 28. Motor 52 also supports pump 14, which is integrally connected thereto, so that pump 14 is enclosed within cavity 36 and is submerged in the cavity reservoir fluid.

Pump 14 has inlet ports 54 for receiving fluid from cavity 36, and has an outlet connection 56, which is connected to a filter 58 by a filter supply tube 60 (as illustrated in FIG. 9), for providing fluid flow from pump 14 to filter 58, which in turn provides fluid flow to valve 18 and thence to actuator 16.

Filter assembly 58 (FIG. 11) has an upper end supported by manifold 50 and has a lower end supported by, and extending through, wall 30. Filter assembly 58 contains a screen 62 and also encloses a check valve 64 adjacent its lower end, which has a fill port 66 with a removable plug, that is sealingly threaded into valve 64 from the exterior side of bottom wall 30. Make-up fluid may be introduced through fill port 66 into cavity 36 to offset any fluid leakage from apparatus 10. Check valve 64 permits the removal of the plug in fill port 66 without outflow of pressurized fluid, the fluid being normally pressurized by the pressurizing piston 38 during both operating and shut-down conditions. In-flow of fluid from tube 60 bypasses check valve 64 and flows through filtering screen 62 in passing through filter 58.

Manifold 50 has a passage 68 which conducts outlet flow from filter 58. Manifold 50 also supports a safety relief valve 70 with an inlet (not shown) connected to passage 65, which opens when a fluid pressure exceeds a designed maximum pressure to return fluid by way of outlets 72 to the reservoir cavity 36. Manifold 50 also supports a check valve 74 connecting to passage 68 and has a passage 76 extending from the outlet of check valve 74 to the inlet of flow control valve 18.

Servo valve 18 receives an inflow from passage 76, which divides into two feed passages 78, 80 before entering valve 18. Manifold 50 has a first supply passage 82 and a second supply passage 84, both of which are connected to servo valve 18 to supply fluid flow from valve 18 to actuator 16. Passage 84 passes through its vertical portion 86 before entering actuator 16. Valve 18 also has a return outlet 88 emptying into reservoir cavity 36.

Servo valve 18 (FIGS. 12, 13) includes a four-way proportional flow-control valve 89 with an adjustable spool-type member 90, which connects passage 78 to passage 82 or alternately, which connects passage 80 to passage 84. Valve 89 has a proportional solenoid coil 92 with a plunger 91, which is fixed to one end of spool 90. Valve 89 also has a pair of springs 93, 95; and has a pair of leads 94, 96 with a terminal block 98.

Valve 18 (FIGS. 12, 13) also has a load sensor 97 and a pressure-regulating relief valve 99, as explained hereafter in further detail.

Actuator 16 has a cylinder 100, preferably in the form of a cylindrical recess disposed in the inner side of manifold 50; and has a piston 102 received in cylinder 100. Piston 102 has a thrust link 104, which is connected at one end to piston 102 by a universal pivot type of connection. Piston 102 forms chambers 106 and 108 in cylinder 100. Cylinder 100 has a partition wall or end cap 110 separating chamber 108 from cavity 36. Piston 102 has a hollow piston rod or actuator rod 112 extending through end cap 110 and surrounding thrust link 104 to allow limited lateral movement of thrust link 104 during its reciprocating motion. Thrust link 104 is pivotally connected to piston 102 by bearing outer races 114, which are disposed between the outer surface of link 104 and the inner surface of hollow rod 112, and which are urged in bearing against link 104 by a bearing retaining nut 116. Equal-area piston 102 also has a solid piston rod 117.

Shaft 20 has an eccentric portion 118, which is pivotally connected to the free end of thrust link 104. Eccentric 118 has recessed bearing races 120 which are urged in bearing against link 104 by a bearing retaining nut 122.

Apparatus 10 has an accumulator 124 which has an axis 126. Accumulator 124 is supported on manifold 50, and is disposed in the portion of reservoir cavity 36 enclosed by cylindrical housing section 12b. Accumulator 124 has an inverted-cup-shaped housing 128 internally threaded to receive an externally threaded annular flange 125 on manifold 50. A piston 130 is fitted to the interior of flange 125 for sliding axial movement relative thereto. The interior space 136 of housing 128 is divided by piston 130 into a sealed, pressurized, accumulator chamber 138 for fluid at pump pressure, having a passage 140 connected to passage 68, and a second or back-up chamber 142 containing fluid at reservoir pressure and having openings 144 in the peripheral wall 132 of the housing for fluid connection to the adjacent portion of reservoir cavity 36. Back-up chamber 142 has an accumulator spring means 146 compressed between housing end wall 134 and piston 130 for allowing a constant-pressure expansion of accumulator chamber 138.

Housing section 12b has an enlarged portion forming a pressurizing cylinder 37 co-axial with respect to axis 126. An inverted-cup-shaped pressurizing piston 38 is co-axially disposed with housing section 12b and has an annular flange with an O-ring in its outer peripheral surface in slidable sealing engagement with the inner surface of pressurizing cylinder 37. A coil spring 154 is compressed between plate 152 and the annular flange of piston 38 for urging the piston against the adjacent reservoir fluid to maintain a positive reservoir pressure during shut-down condition.

Accumulator piston 130 has a hollow piston rod 156 having a cylindrical cavity 158. A plug 160, integral with and projecting axially inwardly from end wall 134, is slidably received in the end of hollow rod 156 remote from piston 130. A pilot piston 162, slidably disposed within hollow rod 156, divides cavity 158 into a sealed pilot chamber 164, which receives fluid at pump pressure through a passage 166 connecting to passage 68, and chamber 168, which receives fluid at reservoir pressure through a passage 170 connecting to chamber 142 and to reservoir cavity 36.

Pilot piston 162 has a piston rod 172 extending through an opening in plug 160 and rigidly connected at its free end to pressurizing piston 38. Pilot piston 162 urges pressurizing piston 38 against the adjacent reservoir fluid to maintain a reservoir fluid pressure during operating condition, which is higher than the aforementioned reservoir pressure provided during a shut-down condition.

As shown diagrammatically in FIG. 7, apparatus 10 also has a position read-out potentiometer 174 enclosed within a housing 176 mounted on the exterior surface of wall 30 (as appears in FIG. 8). Potentiometer 174 includes an electrical resistance element (not shown) and a rotor wiper 178 secured to a drive shaft 180 which projects from housing 176 and extends through wall 30 into cavity 36. A bevel gear 182 fixed to shaft 180 within cavity 36 engages a coaxial, beveled ring gear segment 184 on the outer surface of shaft 20. By means of suitable conventional electrical circuitry (not shown) associated with potentiometer 174, the position of wiper 178 can be monitored and, thus, by suitable calibration, indicate the angular position of shaft 20 relative to a fixed datum.

Load sensor 97 (FIG. 13) includes a shuttle valve 186, which is connected to valve 89, and a controller 188, which is connected to valve 186 and to regulator 99.

Shuttle valve 186 (FIG. 13) has a cylinder 190, a shuttle 192, which is disposed therein for displacement relative thereto, and a pair of springs 194, 196, which are disposed within cylinder 190 adjacent to the opposite ends of shuttle 192.

Shuttle 192 divides cylinder 190 into an intermediate cavity 198 and to end chambers 200, 202, in which springs 194, 196 are respectively disposed. End chambers 200, 202 have respective inlet passages 204, 206, that connect respectively to supply passages 84 and 82. Shuttle 192 also has two spaced annular shoulders 208, 210, which divide intermediate cavity 198 into three intermediate chambers 212, 214, 216. Chambers 212, 216 are disposed adjacent respective end chambers 200, 202; and have respective intermediate inlet passages 218, 220 that connect to supply passages 84 and 82 respectively. Springs 194, 196 have an initial compression, and shoulders 208, 210 have passage overlaps to avoid a small-load disturbance.

Controller 188 (FIG. 13) includes a casing 222, which has an axis 224, and an equal-area disk 226, which is coaxial therewith and disposed therein for displacement relative thereto. Disk 226 divides casing 222 into a pair of chambers 228, 230 with respective control passages 232, 234. Passage 32 connects chamber 228 to chambers 212 and 216; and passage 234 connects chamber 230 to chamber 214. Disk 226 has a pair of piston rods 236, 238, which extend from opposite ends thereof. Rod 238 extends through chamber 230 and through casing 222 and connects to relief valve 99.

Regulator 99 (FIG. 13) has a cylinder 242, and a piston 246, which is coaxial therewith along axis 224, which is movable relative thereto, and which is disposed therein forming a pair of axially-spaced chambers 248, 250. Rod 238 protrudes through chamber 248 and has a pre-load spring means 252, which is disposed in chamber 248 for urging rod 238 against piston 246.

Cylinder 242 (FIG. 13 has a peripheral wall 254 and a pair of axially-spaced end walls 256, 258. Wall 258 has a coaxial annular center step 260, which faces axially inwardly. Wall 254 has a bypass passage 262, which connects chamber 248 to reservoir 36. Wall 258 has an inlet passage 264, which connects to feed passage 78.

Piston 246 (FIG. 13) also has a cylindrical peripheral wall 266, which is in sealing engagement with wall 254. Piston 246 also has a pair of axially outer end walls 268, 270, which enclose an inner cavity 272. Wall 270 has an outer face 274 and an orifice opening 276, which extends therethrough and which connects cavity 272 to chamber 250. Wall 268 has an enlarged passage 278, which connects cavity 272 to chamber 248.

Orifice 276 (FIG. 13) is overlapped by and separated from step 260 by a variable gap 280, which varies in thickness from a minimum thickness of substantially zero to a maximum thickness that is substantially equal to not more than one-quarter of the inner diameter of orifice opening 276.

With this construction, chamber 250 (FIG. 13) has a fluid pressure, which exerts a force that is substantially equal to the sum of the forces exerted by the reservoir pressure in chamber 248 plus the spring rate force of spring 252 and plus the difference in pressures in chambers 228 and 230. In this way, gap 280 varies in thickness with the difference in pressures in actuator passages 82, 84, whereby the outlet pressures in feed passages 76, 80 from pump 14 vary with the load reaction of actuator 16, while actuator supply flow and piston velocity are constant.

Actuation apparatus 10 also has a conventional type of feedback servo 282 (FIG. 7), which connects potentiometer 174 to terminal 98 thereby connecting actuator 16 to valve 18. With this construction, solenoid 92 regulates valve 18, which in turn, operates actuator 16. Solenoid 92 immediately senses any slight reaction of actuator 16 thereby providing a sensitive, proportional control on actuator 16 for setting the velocity levels of piston 102.

In summary, this invention provides a closed-loop, constant-flow, variable-pressure type of hydraulic actuation system for driving a variable load, in which the variation in the ratio of power input to power output is substantially minimized, and in which the output piston operates at a substantially-constant velocity. In addition, the aforementioned system provides a sealed and submerged type of system, which has a constant-pressure, low-pressure portion and also has a variable-pressure, high-pressure portion, that are sealed from the outside atmosphere, and which has an integral torquing shaft extending therefrom for ease of connection thereto.

While the present invention has been described in a preferred embodiment, it will be obvious to those skilled in the art that various modifications can be made therein within the scope of the invention. It is intended that the appended claims cover all such modifications.

What is claimed is:

1. A hydraulic actuation apparatus comprising:
   a constant-flow pump;
   a fluid actuator with a pair of chambers;
   a flow-control valve for shifting the flow between said chambers having a feed passage connecting to said pump and having a pair of supply passages connecting respectively to said chambers and having a return passage;
   a reservoir connecting to said valve return passage and connecting to said pump; and
   a load-sensing pressure regulating servo valve having a sensor connecting to said supply passages and automatically sensing the difference in pressures in said chambers due to an actuator-load reaction thereon and having a regulator coupled to said sensor and connecting to said feed passage and connecting to said reservoir.
   whereby the fluid pressure in said feed passage and the power input is varied in linear proportion to said actuator-load reaction and the power output, at substantially constant supply flow.

2. An apparatus as claimed in claim 1, in which said sensor comprises:
   a shuttle valve with a plurality of chambers connecting to said actuator chambers for sensing a pressure differential in either actuator chamber over its opposite actuator chamber; and
   a controller having a cylinder with a piston therein connecting to said regulator and forming a pair of controller chambers operatively connecting to said shuttle chambers
   whereby said regulator is displaced in linear proportion to said shuttle pressure differential.

3. An apparatus as claimed in claim 1, including a feedback servo coupled to said actuator piston and to said flow-control valve
   whereby said actuator piston is displaced at a substantially-constant velocity at different velocity levels.

4. A combination drive and support device for a power takeoff comprising a housing having walls forming a fluid-tight reservoir cavity containing a pressurized fluid having a pressure higher than the atmosphere outside said housing;
   power takeoff means exterior thereto and supported therefrom with a portion extending into said reservoir cavity and immersed in said fluid for movement relative thereto;
   a drive means immersed in said fluid and operatively connecting to said power takeoff means for overcoming the distance to said relative movement; and in which said drive means includes a closed-loop hydraulic actuation apparatus according to claim 6 having components disposed in said fluid and sealed off from the atmosphere outside said housing.

5. An apparatus as claimed in claim 2, in which said actuator is an equal-area type of actuator having cylinder with a piston disposed therein having equal-area end faces;

said flow-control valve is a four-way type of flow-control valve for alternately connecting said actuator chambers to said reservoir; and said regulator includes a cylinder with a piston disposed therein forming an adjustable orifice therebetween and between said passage and said reservoir, said regulator piston being fixedly connected to said controller piston whereby said orifice is varied in linear proportion to said actuator-load reaction.

References Cited

UNITED STATES PATENTS

| | | | |
|---|---|---|---|
| 1,982,711 | 12/1934 | Vickers | 60—52 |
| 2,102,865 | 12/1937 | Vickers | 60—52 |

EDGAR W. GEOGHEGAN, *Primary Examiner.*

UNITED STATES PATENT OFFICE
CERTIFICATE OF CORRECTION

Patent No. 3,357,179                      December 12, 1967

Douglas F. Gourlay et al.

It is hereby certified that error appears in the above numbered patent requiring correction and that the said Letters Patent should read as corrected below.

Column 7, line 4, for the claim reference numeral "6" read -- 1 --.

Signed and sealed this 18th day of February 1969.

(SEAL)
Attest:

Edward M. Fletcher, Jr.                      EDWARD J. BRENNER
Attesting Officer                            Commissioner of Patents